United States Patent
Ahn et al.

(10) Patent No.: US 10,147,916 B2
(45) Date of Patent: Dec. 4, 2018

(54) BATTERY CELL

(71) Applicant: Hyundai Motor Company, Seoul (KR)

(72) Inventors: Seung Ho Ahn, Hanam (KR); Ik Kyu Kim, Seoul (KR); Woo Jin Shin, Seoul (KR); Hong Seok Min, Yongin (KR); Sung Min Choi, Gyeongju (KR); Jung Je Woo, Goyang (KR); Jung Young Cho, Seoul (KR); Se Jung Oh, Goyang (KR); Hoi Suk Han, Siheung (KR)

(73) Assignee: Hyundai Motor Company, Seoul (KR)

( * ) Notice: Subject to any disclaimer, the term of this patent is extended or adjusted under 35 U.S.C. 154(b) by 226 days.

(21) Appl. No.: 15/164,281

(22) Filed: May 25, 2016

(65) Prior Publication Data

US 2017/0117515 A1    Apr. 27, 2017

(30) Foreign Application Priority Data

Oct. 22, 2015    (KR) .................. 10-2015-0147443

(51) Int. Cl.
*H01M 2/02*    (2006.01)
*H01M 2/06*    (2006.01)
*H01M 2/26*    (2006.01)
*H01M 2/30*    (2006.01)
*H01M 2/34*    (2006.01)

(52) U.S. Cl.
CPC .............. *H01M 2/06* (2013.01); *H01M 2/26* (2013.01); *H01M 2/30* (2013.01); *H01M 2/345* (2013.01); *H01M 2/0207* (2013.01)

(58) Field of Classification Search
CPC ..................................................... H01M 2/345
See application file for complete search history.

(56) References Cited

U.S. PATENT DOCUMENTS

| 6,713,209 | B1 * | 3/2004 | Naskali | ................... | H01M 2/34 429/56 |
| 2001/0038938 | A1 * | 11/2001 | Takahashi | ................ | H01G 2/14 429/53 |
| 2003/0228515 | A1 * | 12/2003 | Woehrle | .................. | H01M 2/08 429/160 |
| 2007/0196732 | A1 * | 8/2007 | Tatebayashi | .......... | B60L 11/123 429/181 |
| 2010/0055558 | A1 | 3/2010 | Choi et al. | | |
| 2011/0183161 | A1 | 7/2011 | Son et al. | | |
| 2014/0011060 | A1 | 1/2014 | Yang et al. | | |

FOREIGN PATENT DOCUMENTS

| KR | 2009-0013867 A | 2/2009 |
| KR | 10-0891078 B1 | 3/2009 |
| KR | 2009-0060497 A | 6/2009 |

(Continued)

*Primary Examiner* — Maria Laios
(74) *Attorney, Agent, or Firm* — Mintz Levin Cohn Ferris Glovsky and Popeo, P.C.; Peter F. Corless

(57) ABSTRACT

A battery cell includes: an electrode assembly; a pouch case accommodating the electrode assembly therein; and an electrode lead including an outer lead protruding to an outside of the pouch case and an inner lead disposed between the outer lead and the electrode assembly, accommodated in the pouch case, bent plural times in a direction in which it connects the electrode assembly and the outer lead to each other, and cut by expansion force of the pouch case.

5 Claims, 6 Drawing Sheets

(56) References Cited

FOREIGN PATENT DOCUMENTS

| KR | 10-1010377 B1 | 1/2011 |
| KR | 10-2011-0034489 A | 4/2011 |
| KR | 10-2011-0048470 A | 5/2011 |
| KR | 10-2013-0117637 A | 10/2013 |
| KR | 2014-0032165 A | 3/2014 |

\* cited by examiner

//BATTERY CELL

CROSS-REFERENCE TO RELATED APPLICATION

This application claims under 35 U.S.C. § 119(a) the benefit of Korean Patent Application No. 10-2015-0147443, filed on Oct. 22, 2015 in the Korean Intellectual Property Office, the entire contents of which are incorporated by reference herein.

BACKGROUND

(a) Technical Field

The present invention relates to a battery cell, and more particularly, to a pouch type battery cell capable of blocking a flow of current at the time of generation of overcharge.

(b) Description of the Related Art

In accordance with an increase in the use of portable electrical products such as video cameras, cell phones, personal computers (PCs), tablets, and the like, the importance of a secondary battery for use with such products as a driving power supply has increased.

The secondary battery that may be charged and discharged has been actively studied in accordance with the development of state-of-the-art fields such as a digital camera, a cellular phone, a laptop computer, a power tool, an electric bicycle, an electric vehicle, a hybrid vehicle, a large-capacity power storage, and the like.

Particularly, a lithium secondary battery has energy density per unit weight higher than that of other secondary batteries such as an existing lead storage battery, nickel-cadmium battery, nickel-hydrogen battery, nickel-zinc battery, and the like, and may be rapidly charged. Therefore, the use of a lithium secondary battery has increased.

The lithium secondary battery, which has an operating voltage of 3.6V or more, is used as a power supply of a portable electronic device, or a plurality of lithium secondary batteries connected to each other in series or in parallel are used in a high output electric vehicle, hybrid vehicle, power tool, electric bicycle, power storage, uninterruptible power supply (UPS), and the like.

Since the lithium secondary battery has an operating voltage three times higher than that of a nickel-cadmium battery or a nickel-metal hydride battery and has energy density characteristics per unit weight better than those of the nickel-cadmium battery or the nickel-metal hydride battery, the use of the lithium secondary battery has rapidly increased.

A lithium ion battery using a liquid electrolyte typically is used in a form in which it is welded and sealed using a metal can having a cylindrical shape or a prismatic shape as a container. A can type secondary battery using the metal can as the container has a fixed form, which limits a design of an electrical product using the can type secondary battery as a power supply and makes it difficult to reduce the volume thereof. Therefore, a pouch type secondary battery in which an electrode assembly and an electrolyte are put and sealed in a pouch package formed of a film has been developed and used.

However, in the case in which the lithium secondary battery is overheated, there is a risk that the lithium secondary battery will explode, such that it is important that the lithium secondary battery be packaged in a stable manner, so as to avoid explosion.

Overheating of a lithium secondary battery is generated due to several causes. One of these causes may be a case in which an over-current of a limit or more flows through the lithium secondary battery. When the over-current flows, heat is generated in the lithium secondary battery by Joule's heat, such that an internal temperature of the lithium secondary battery rapidly rises. In addition, the rapid rise in the internal temperature causes a decomposition reaction of an electrolyte solution to generate thermal runaway, which can lead to the explosion of the lithium secondary battery. The over-current is generated in the case in which a sharp metal object penetrates through the lithium secondary battery, insulation between a cathode and an anode is broken due to shrinkage of a separator interposed between the cathode and the anode, or a rush current is applied to the lithium secondary battery due to abnormality of a charging circuit or a load connected to the outside.

Therefore, the lithium secondary battery is used in a state in which it is coupled to a protection circuit in order to be protected from an abnormal situation such as a situation in which the over-current is generated, and a fuse element irreversibly disconnecting a line through which a charging or discharging current flows when the over-current is generated is generally included in the protection circuit. However, in the case in which the fuse element malfunctions, internal pressure of the lithium secondary battery configuring a battery module and/or a battery pack, that is, a battery cell, may be continuously increased, such that there is a risk such as ignition, explosion, or the like.

Therefore, there is a need to more securely block a flow of a current at the time of an increase in the internal pressure of the battery cell to secure safety.

SUMMARY

An aspect of the present invention provides an electrode lead automatically blocking a current applied to a battery cell when the battery cell is overcharged.

An aspect of the present invention also provides a technology of blocking a current applied to a battery cell through a mechanical operation without using a separate power supply or controller.

An aspect of the present invention also provides an electrode lead having a current blocking function and capable of being formed in an integrated type.

An aspect of the present invention also provides a technology of reducing a resistance by minimizing a path through which a current flows.

Aspects of the present invention are not limited to the above-mentioned aspects. That is, other aspects that are not mentioned may be obviously understood by those skilled in the art from the following specification.

According to an exemplary embodiment of the present invention, a battery cell includes: an electrode assembly; a pouch case accommodating the electrode assembly therein; and an electrode lead including an outer lead protruding to an outside of the pouch case and an inner lead disposed between the outer lead and the electrode assembly, accommodated in the pouch case, bent plural times in a direction in which it connects the electrode assembly and the outer lead to each other, and cut by expansion force of the pouch case.

According to another exemplary embodiment of the present invention, a battery cell includes: an electrode assembly;

a pouch case accommodating the electrode assembly therein; and an electrode lead including an outer lead protruding to an outside of the pouch case and an inner lead disposed between the outer lead and the electrode assembly and accommodated in the pouch case, wherein the inner lead has two surfaces coupled to the pouch case and is bent in an 'S' shape.

Detailed contents of other exemplary embodiments are described in a detailed description and are illustrated in the accompanying drawings.

BRIEF DESCRIPTION OF THE DRAWINGS

The above and other objects, features and advantages of the present invention will be more apparent from the following detailed description taken in conjunction with the accompanying drawings.

DETAILED DESCRIPTION

Figure 1:
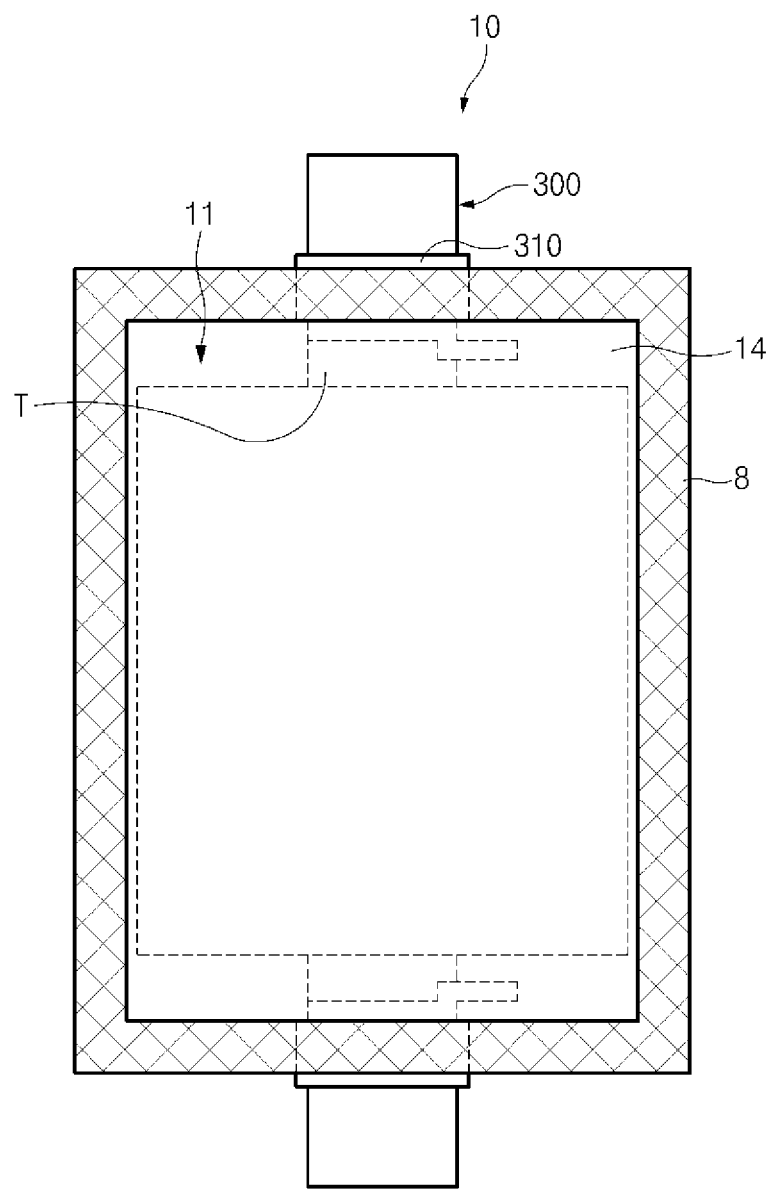
FIG. 1 is a plan view of a battery cell according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Various advantages and features of the present invention and methods accomplishing them will become apparent from the following description of exemplary embodiments with reference to the accompanying drawings.

However, the present invention is not limited to exemplary embodiments to be described below, but may be implemented in various different forms, these exemplary embodiments will be provided only in order to make the present invention complete and allow those skilled in the art to completely recognize the scope of the present invention, and the present invention will be defined by the scope of the claims. Throughout the specification, like reference numerals denote like elements.

Hereinafter, a battery cell according to an exemplary embodiment of the present invention will be described with reference to the accompanying drawings.

FIG. 1 is a plan view of a battery cell according to an exemplary embodiment of the present invention.

Referring to FIG. 1, the battery cell 10 includes an electrode assembly 11, a pair of electrode leads 300; a pouch adhesion layer 310; and a pouch case 14.

The electrode assembly 11 includes a cathode plate, an anode plate, a separator, and electrode tabs T. The electrode assembly 11 may be a stack type electrode assembly formed by interposing the separator between the cathode plate and the anode plate that are stacked.

In addition, the electrode assembly 11 may also be formed in a jelly-roll type.

The cathode plate may be formed by applying a cathode active material to a collecting plate made of aluminum (Al). In addition, the anode plate may be formed by applying an anode active material to a collecting plate made of copper (Cu).

The electrode tabs T, which are formed integrally with electrode plates, that is, the cathode plate or the anode plate, correspond to non-coated regions in which an electrode active material is not applied in electrode plates. In particular, the electrode tabs T include a cathode tab corresponding to a region in which the cathode active material is not applied in the cathode plate, and an anode tab corresponding to a region in which the anode active material is not applied in the anode plate.

The electrode leads 300, which are thin planar metals, are attached to the electrode tabs T and are extended outward from the electrode assembly 11. The electrode leads 300 include a cathode lead attached to the cathode tab and an anode lead attached to the anode tab. The cathode lead and the anode lead may be extended in the same direction or be extended in opposite directions depending on positions of the cathode tab and the anode tab.

The pouch adhesion layer 310, which is attached to a circumference of the electrode lead 300 in a width direction and is interposed between the electrode lead 300 and an inner surface of the pouch case 14, is formed of a film having an insulation property and a heat-fusion property. The pouch adhesion layer 310 may be a layer (a single layer or a multi-layer) made of one or more materials selected from the group consisting of polyimide (PI), polypropylene (PP), polyethylene (PE), polyethylene terephthalate (PET), and the like.

The pouch adhesion layer 310 prevents generation of a short-circuit between the electrode lead 300 and a metal layer of the pouch case 14. In addition, the pouch adhesion layer 310 serves to improve sealing force of the pouch case 14 in a region in which the electrode lead 300 is led.

That is, since the electrode lead 300 formed of a metal plate and the inner surface of the pouch case 14 are not adhered to each other well, even though an edge region 8 of the pouch case 14 is heat-fused to seal the pouch case, a sealing property in the region in which the electrode lead 300 is led may be deteriorated. In addition, this sealing property deterioration phenomenon is intensified in the case in which nickel (Ni) is coated on a surface of the electrode lead 300.

Therefore, the pouch adhesion layer 310 is interposed between the electrode lead 300 and the inner surface of the pouch case 14, thereby making it possible to improve a sealing property of the battery cell 10.

The pouch case 14 is sealed by heat-fusing the edge region 8 such that a first surface 14a and a second surface 14b contact each other in a state in which it accommodates the electrode assembly 11 therein so that the electrode lead 300 is led to an outside of the pouch case 14.

The pouch case 14 may have a multilayer structure in order to secure an excellent heat-fusion property, rigidity for maintaining a shape and protecting the electrode assembly 11, and an insulation property. For example, the pouch case 14 may have the multilayer structure including a first layer positioned at the innermost side to face the electrode assembly 11, a second layer positioned at the outermost layer to thereby be exposed directly to an external environment, and a third layer interposed between the first layer and the second layer.

In this case, for example, the first layer may be made of a material having corrosion resistance to an electrolyte solution, an insulation property, and a heat fusion property, such as polypropylene (PP), the second layer may be made of a material having rigidity for maintaining a shape and an insulation property, such as polyethylene terephthalate (PET), and the third layer may be formed of a metal such as aluminum (Al).

Gas may be generated in the battery cell in an abnormal situation such as generation of a short-circuit, overcharge, or the like, in the battery cell 10. The pouch case 14 is expanded due to the gas, and may explode when the abnormal situation is not solved.

Figure 2A:
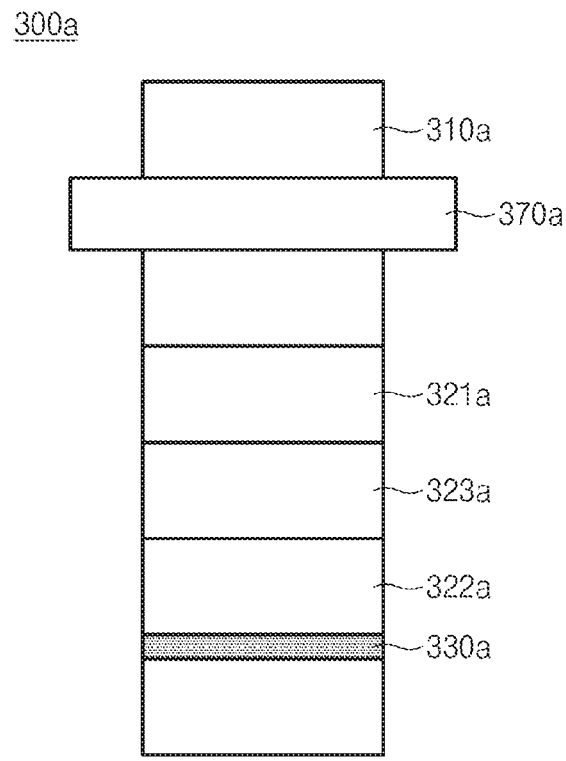
FIG. 2A is a plan view of an electrode lead according to an exemplary embodiment of the present invention before being assembled.
Figure 2B:
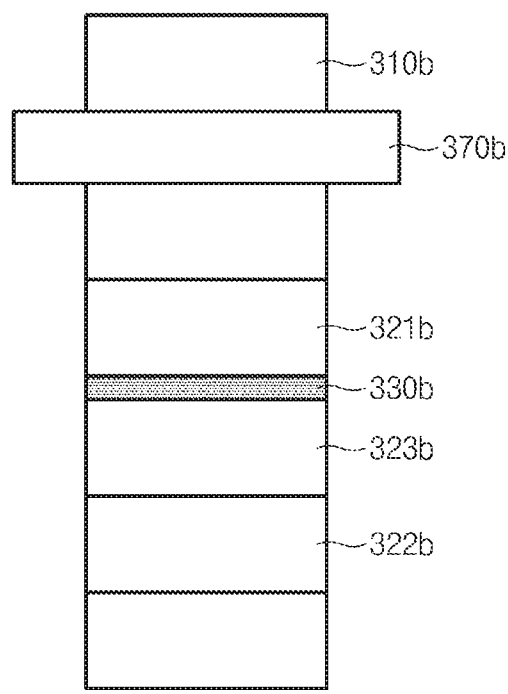
FIG. 2B is a plan view of an electrode lead different from that of FIG. 2A before being assembled.
Figure 3:
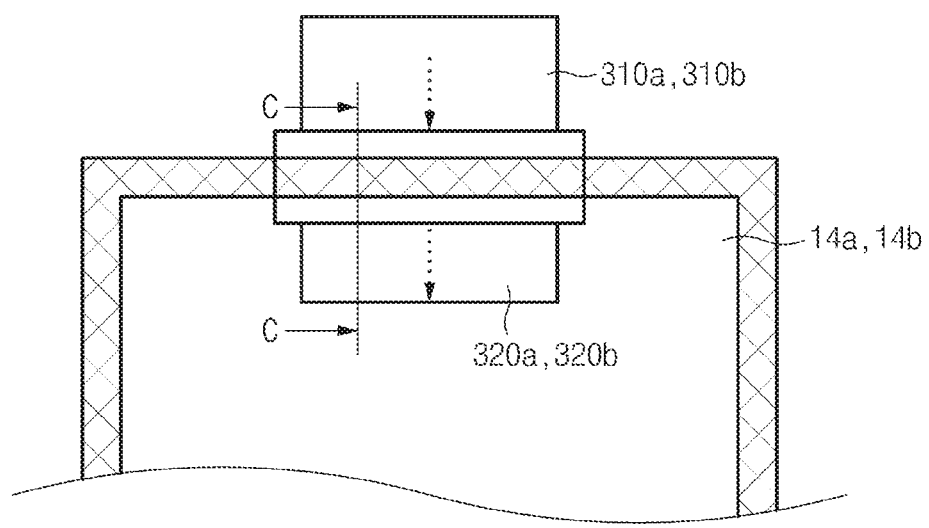
FIG. 3 is a plan view illustrating a state in which an electrode lead according to another exemplary embodiment of the present invention and a pouch case are coupled to each other.

FIG. 2A is a plan view of an electrode lead 300a or 300b according to an exemplary embodiment of the present invention before being assembled; and FIG. 2B is a plan view of an electrode lead 300a or 300b different from that of FIG. 2A before being assembled. FIG. 3 is a plan view illustrating a state in which an electrode lead 300a and 300b according to another exemplary embodiment of the present invention and a pouch case 14 are coupled to each other.

Referring to FIGS. 2A to 3, the battery cell 10 according to the present exemplary embodiment includes the electrode assembly 11; the pouch case 14 accommodating the electrode assembly 11 therein; and the electrode lead 300a or 300b including an outer lead 310a or 310b protruding to an outside of the pouch case 14 and an inner lead 320a or 320b disposed between the outer lead 310a or 310b and the electrode assembly 11, accommodated in the pouch case 14, having a length direction that is in parallel with a straight line connecting the electrode assembly 11 and the outer lead 310a or 310b to each other at the shortest length, and cut by expansion force of the pouch case 14.

The battery cell 10 according to the present exemplary embodiment includes the electrode assembly 11; the pouch case 14 accommodating the electrode assembly 11 therein; and the electrode lead 300a or 300b including the outer lead 310a or 310b protruding to an outside of the pouch case 14 and the inner lead 320a or 320b disposed between the outer lead 310a or 310b and the electrode assembly 11 and accommodated in the pouch case 14, wherein the inner lead 320a or 320b has two surfaces coupled to the pouch case 14 and is bent in an 'S' shape.

The pouch case 14 has the first surface 14a and the second surface 14b facing each other, and the inner lead 320a or 320b includes a first inner lead 321a or 321b connected to the outer lead 310a or 310b and coupled to the first surface 14a; and a second inner lead 322a or 322b coupled to the second surface 14b and connected to the electrode assembly 11. Pouch adhesion layers 370a or 370b coupling the pouch case 14 and the inner lead 320a or 320b to each other are formed between the first surface 14a and the first inner lead 321a or 321b and between the second surface 14b and the second inner lead 322a or 322b, and a weak part 330a or 330b having brittleness higher than that of the pouch adhesion layers 370a or 370b is formed in the inner lead 320a or 320b.

The weak part 330a or 330b is formed at one side based on the pouch adhesion layer 370a or 370b, and a bent part 360a or 360b bent when the pouch case 14 is expanded is formed at the other side based on the pouch adhesion layer 370a or 370b. A notch is formed in the weak part 330a or 330b. The notch may have a groove shape or have a shape in which holes are formed at predetermined intervals. The notch promotes fracture of the electrode lead 300a or 300b.

The inner lead 320a or 320b further includes an intermediate lead 323a or 323b connecting the first inner lead 321a or 321b and the second inner lead 322a or 322b to each other. The intermediate lead 323a or 323b is disposed between the first inner lead 321a or 321b and the second inner lead 322a or 322b so as to be overlapped with the first inner lead 321a or 321b and the second inner lead 322a or 322b. Lead adhesion layer 340a or 340b containing an insulation and adhesion component is formed in any one of a space between the first inner lead 321a or 321b and the intermediate lead 323a or 323b and a space between the second inner lead 322a or 322b and the intermediate lead 323a or 323b.

The lead adhesion layer 340a or 340b is formed in any one of the space between the first inner lead 321a or 321b and the intermediate lead 323a or 323b and the space between the second inner lead 322a or 322b and the intermediate lead 323a or 323b, and an insulator 350a or 350b does not have adhesion and has an insulation property is disposed at the other thereof.

The bent part 360a or 360b is formed between the first inner lead 321a or 321b and the intermediate lead 323a or 323b and between the intermediate lead 323a or 323b and the second inner lead 322a or 322b, and the weak part 330a or 330b is formed in the bent part 360a or 360b. The insulator 350a or 350b is disposed at an overlapped portion of the inner lead 320a or 320b in which the weak part 330a or 330b is formed. The weak part 330a or 330b is disposed at one side of the insulator 350a or 350b, and the lead adhesion layer 340a or 340b is disposed at the other side of the insulator 350a or 350b.

The first inner lead 321a or 321b, the intermediate lead 323a or 323b, and the second inner lead 322a or 322b are bent in an 'S' shape, and are formed integrally with each other. At least one of the first inner lead 321a or 321b, the second inner lead 322a or 322b, and the intermediate lead 323a or 323b may be made of a plastic material that is plastically deformed by the expansion of the pouch case 14.

Figure 4A:
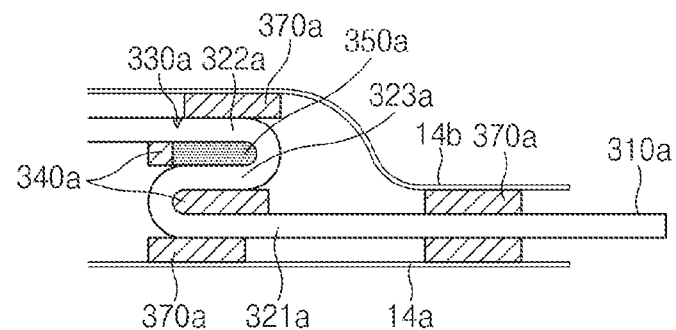
FIG. 4A is a cross-sectional view taken along line C-C of FIG. 3 when the battery cell is in a normal state and an electrode lead corresponds to that of FIG. 2A.
Figure 4B:
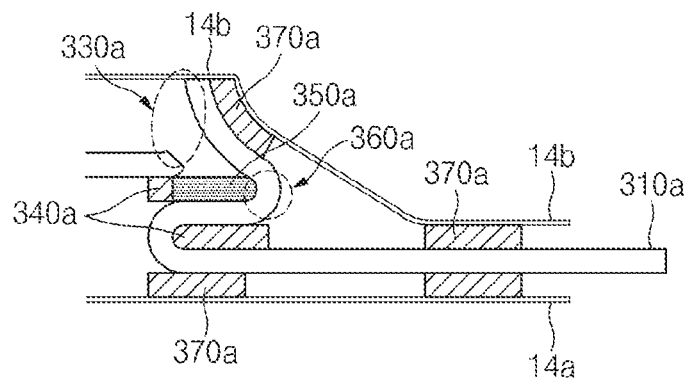
FIG. 4B illustrates a state of the battery cell in which a pouch case is expanded, such that the electrode lead is cut.
Figure 4C:
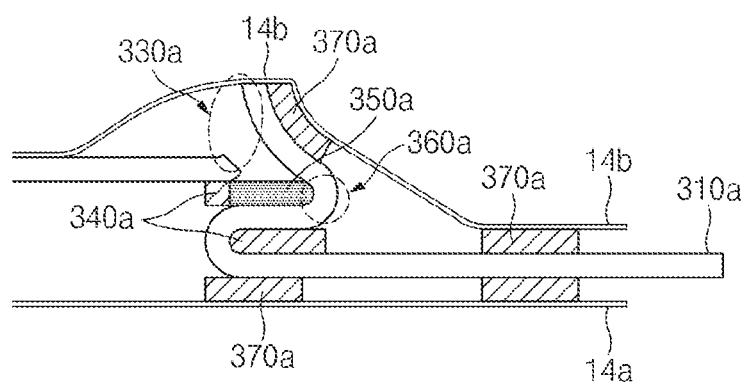
FIG. 4C illustrates a state of the battery cell in which the pouch case is contracted after being expanded.
Figure 5A:
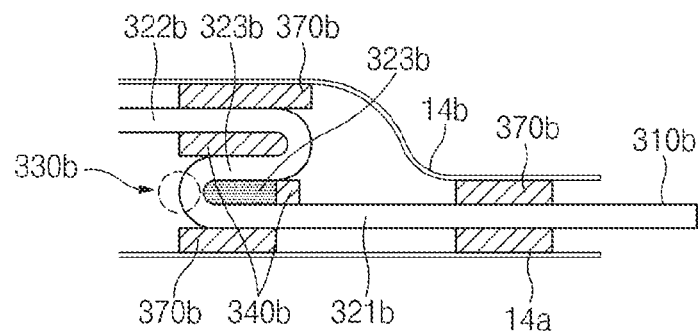
FIG. 5A is a cross-sectional view taken along line C-C of FIG. 3 when the battery cell is in a normal state and an electrode lead corresponds to that of FIG. 2B.
Figure 5B:
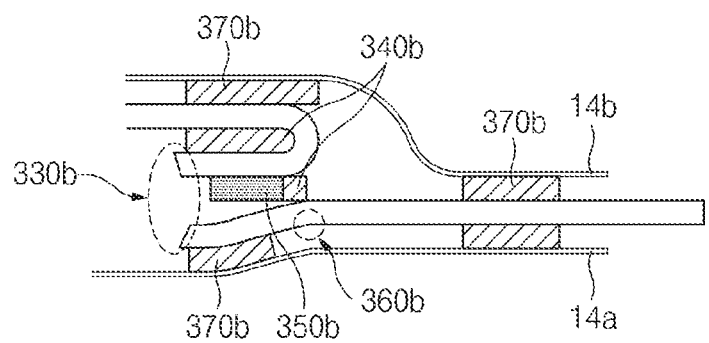
FIG. 5B illustrates a state of the battery cell in which a pouch case is expanded, such that the electrode lead is cut.
Figure 5C:
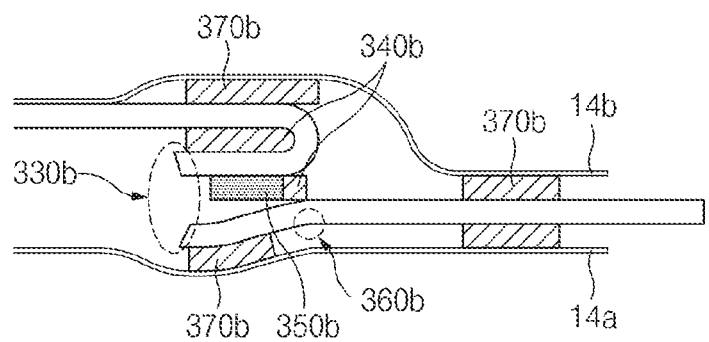
FIG. 5C illustrates a state of the battery cell in which the pouch case is contracted after being expanded.

FIG. 4A is a cross-sectional view taken along line C-C of FIG. 3 when the battery cell 10 is a normal state and an electrode lead 300a or 300b corresponds to that of FIG. 2A; FIG. 4B illustrates a state of the battery cell 10 in which a pouch case is expanded, such that the electrode lead 300a or 300b is cut; and FIG. 4C illustrates a state of the battery cell 10 in which the pouch case is contracted after being expanded. FIG. 5A is a cross-sectional view taken along line C-C of FIG. 3 when the battery cell 10 is a normal state and an electrode lead 300a or 300b corresponds to that of FIG. 2B; FIG. 5B illustrates a state of the battery cell 10 in which a pouch case is expanded, such that the electrode lead 300a or 300b is cut; and FIG. 5C illustrates a state of the battery cell 10 in which the pouch case is contracted after being expanded.

Referring to FIGS. 4A to 5C, when the battery cell 10 is normally operated, gas is not present in the battery cell 10, such that the first inner lead 321a or 321b, the second inner lead 322a or 322b, and the intermediate lead 323a or 323b are maintained in a state in which they are overlapped with each other. When the gas is filled in the battery cell 10 due to generation of overcharge, the pouch case 14 is expanded. When the pouch case 14 is expanded, tension is generated in the first inner lead 321a or 321b and the second inner lead 322a or 322b in a direction in which the first inner lead 321a or 321b and the second inner lead 322a or 322b become distant from each other. Meanwhile, the first inner lead 321a or 321b or the second inner lead 322a or 322b is spaced apart from the intermediate lead 323a or 323b at a portion at which the insulator 350a or 350b that does not have adhesion is disposed. Since force acts on the first inner lead 321a or 321b and the second inner lead 322a or 322b in the direction in which the first inner lead 321a or 321b and the second inner lead 322a or 322b become distant from each other due to the pouch adhesion layer 370a or 370b, fracture is generated in the weak part 330a or 330b. Therefore, the electrode lead 300a or 300b loses a function of a conducting wire, and a current is blocked. Then, even though the pouch case 14 is contracted, a shape in which the first inner lead 121 and the second inner lead 122 are spaced apart from each other is maintained as it is since the electrode lead 300a or 300b is made of a plastic material. Therefore, even though an abnormal state ends, an over-current does not again flow to the electrode assembly 11, and stability in the use of the battery cell 10 may be secured.

Meanwhile, according to the present exemplary embodiment, the first inner lead 321a or 321b, the intermediate lead 323a or 323b, and the second inner lead 322a or 322b are formed as a straight line. Therefore, since a current path is shortened while blocking a current if necessary, a resistance is reduced.

As described above, according to the exemplary embodiments of the present invention, there are the following effects.

First, an electrode lead automatically blocking a current applied to a battery cell when the battery cell is overcharged is provided.

Second, a current applied to a battery cell is blocked through a mechanical operation without using a separate power supply or controller.

Third, an electrode lead having a current blocking function and capable of being formed in an integrated type is provided.

Fourth, a resistance is reduced by minimizing a path through which a current flows.

The effects of the present invention are not limited to the above-mentioned effects. That is, other effects that are not mentioned may be obviously understood by those skilled in the art from the claims.

Hereinabove, although the present invention has been described with reference to exemplary embodiments and the accompanying drawings, the present invention is not limited thereto, but may be variously modified and altered by those skilled in the art to which the present invention pertains without departing from the spirit and scope of the present invention claimed in the following claims.

What is claimed is:

1. A battery cell, comprising:
an electrode assembly;
a pouch case accommodating the electrode assembly therein and having a first surface and a second surface facing each other;
an electrode lead including an outer lead protruding to an outside of the pouch case and an inner lead disposed between the outer lead and the electrode assembly, accommodated in the pouch case, bent plural times in a direction in which it connects the electrode assembly and the outer lead to each other, and cut by expansion force of the pouch case; and
an insulating layer that has an insulation property, but does not have adhesion, disposed in a space defined by the inner lead, the insulating layer configured to insulate the electrode assembly from the outer lead when the inner lead is cut by the expansion force of the pouch case,
wherein the inner lead includes a first inner lead connected to the outer lead and coupled to the first surface, a second inner lead coupled to the second surface and connected to the electrode assembly, and an intermediate lead connecting the first inner lead and the second inner lead to each other and disposed between the first inner lead and the second inner lead so as to be overlapped with the first inner lead and the second inner lead,
wherein pouch adhesion layers coupling the pouch case and the inner lead to each other are formed between the first surface and the first inner lead and between the second surface and the second inner lead,
wherein a weak part having brittleness higher than that of the pouch adhesion layers is formed in the inner lead,
wherein a lead adhesion layer containing an insulation and adhesion component is formed in any one of a space between the first inner lead and the intermediate lead and a space between the second inner lead and the intermediate lead, wherein a bent part is formed between the first inner lead and the intermediate lead and between the intermediate lead and the second inner lead, and the weak part is formed in the bent part, wherein the insulating layer is disposed at an overlapped portion of the inner lead in which the weak part is formed, and wherein the weak part is disposed at one side of the insulating layer.

2. The battery cell according to claim 1, wherein a notch is formed in the weak part.

3. The battery cell according to claim 1, wherein the lead adhesion layer is disposed at the other side of the insulating layer.

4. The battery cell according to claim 1, wherein the first inner lead, the intermediate lead, and the second inner lead are bent in an 'S' shape, and are formed integrally with each other.

5. A battery cell, comprising:

an electrode assembly;

a pouch case accommodating the electrode assembly therein and having a first surface and a second surface facing each other;

an electrode lead including an outer lead protruding to an outside of the pouch case and an inner lead disposed between the outer lead and the electrode assembly and accommodated in the pouch case; and an insulating layer that has an insulation property, but does not have adhesion, disposed in a space defined by the inner lead, the insulating layer configured to insulate the electrode assembly from the outer lead when the inner lead is cut by the expansion force of the pouch case, wherein the inner lead has two surfaces coupled to the pouch case and is bent in an 'S' shape, wherein the inner lead includes a first inner lead connected to the outer lead and coupled to the first surface, a second inner lead coupled to the second surface and connected to the electrode assembly, and an intermediate lead connecting the first inner lead and the second inner lead to each other and disposed between the first inner lead and the second inner lead so as to be overlapped with the first inner lead and the second inner lead, wherein pouch adhesion layers coupling the pouch case and the inner lead to each other are formed between the first surface and the first inner lead and between the second surface and the second inner lead, wherein a weak part having brittleness higher than that of the pouch adhesion layers is formed in the inner lead, wherein a lead adhesion layer containing an insulation and adhesion component is formed in any one of a space between the first inner lead and the intermediate lead and a space between the second inner lead and the intermediate lead, wherein a bent part is formed between the first inner lead and the intermediate lead and between the intermediate lead and the second inner lead, and the weak part is formed in the bent part, wherein the insulating layer is disposed at an overlapped portion of the inner lead in which the weak part is formed, and wherein the weak part is disposed at one side of the insulating layer.

\* \* \* \* \*